United States Patent [19]

Belart et al.

[11] Patent Number: 4,902,077
[45] Date of Patent: Feb. 20, 1990

[54] HYDRAULIC BRAKE SYSTEM

[75] Inventors: Juan Belart; Werner Volkmar, both of Walldorf; Bernd Schuett, Oberursel; Peter Stahlheber, Wiesbaden, all of Fed. Rep. of Germany

[73] Assignee: Alfred Teves, GmbH, Frankfurt am Main, Fed. Rep. of Germany

[21] Appl. No.: 624,623

[22] Filed: Jun. 26, 1984

[30] Foreign Application Priority Data

Jun. 30, 1983 [DE] Fed. Rep. of Germany ....... 3323500

[51] Int. Cl.$^4$ .............................................. B60T 8/02
[52] U.S. Cl. .................................. 303/113; 188/352; 303/61; 303/119
[58] Field of Search .................. 188/352; 303/61, 113, 303/116, 119; 137/509, 517, 514; 251/321, 322, 247

[56] References Cited

U.S. PATENT DOCUMENTS

| | | | |
|---|---|---|---|
| 3,172,421 | 3/1965 | Rayfield | 137/509 X |
| 3,302,980 | 2/1967 | Bystricky et al. | 137/509 X |
| 3,359,994 | 12/1967 | Lapointe | 188/352 X |
| 3,425,750 | 2/1969 | Deane | 188/352 X |
| 3,532,391 | 10/1970 | Klein | 303/61 X |
| 3,617,098 | 11/1971 | Leiber | 303/61 X |
| 3,731,980 | 5/1973 | Fink et al. | 303/119 |
| 3,753,598 | 8/1973 | Michellone et al. | 303/119 |
| 3,886,969 | 6/1975 | Shira et al. | 137/509 |
| 4,017,329 | 4/1977 | Larson | 134/2 |
| 4,174,615 | 11/1979 | Kuhn | 188/352 X |
| 4,362,339 | 12/1982 | Belart | 303/113 X |
| 4,503,628 | 3/1985 | Wimbush | 188/352 X |
| 4,521,061 | 6/1985 | Belart et al. | 188/181 R |

FOREIGN PATENT DOCUMENTS 2811587 9/1977 Fed. Rep. of Germany .
2086510 5/1982 United Kingdom .

*Primary Examiner*—Andres Kashnikow
*Assistant Examiner*—Matthew C. Graham
*Attorney, Agent, or Firm*—Robert P. Seitter

[57] ABSTRACT

A hydraulic brake system with slip control wherein at least one wheel brake (11) of an automotive vehicle is connected to a master cylinder (1). A normally opened inlet valve (8) which is adapted to be switched into a closed position is inserted in the connection between the master cylinder (1) and the wheel brake (11). The supply reservoir (6) of the master cylinder (1) contains an opening (13) which can be tightly closed by a filling device. To speed up the filling procedure of like brake systems, an additional connection is established between the supply reservoir (6) and the wheel brake (11) which is controllable by a valve (15). A like arrangement accelerates the venting and filling procedure, since the inlet valve (8) and its throttling action are by-passed.

13 Claims, 6 Drawing Sheets

HYDRAULIC BRAKE SYSTEM

BACKGROUND OF THE INVENTION

The present invention relates to a hydraulic brake system with slip control, wherein at least one wheel brake of an automotive vehicle is connected to a master cylinder, wherein a normally opened inlet valve is inserted in the connection between the master cylinder and the wheel brake which is adapted to be switched into a closed position, and wherein the supply reservoir of the master cylinder includes an opening which is adapted to be tightly closed by a filling device.

When filling such hydraulic brake systems, it is commonly known and conventional practice to generate a relatively high vacuum in the brake system, prior to filling it with brake fluid, by way of the supply reservoir of the master cylinder so that air bubbles in the brake system will be substantially avoided during the subsequent charging with brake fluid. If solenoid valves are provided in the hydraulic brake system for the purpose of a slip-responsive braking pressure modulation, the venting of the brake system will be delayed considerably, since the design of the valves makes them act like throttles. Moreover, filter elements are arranged in the solenoid valves which delay the procedure of venting the brake system. This is particularly apparent with filling procedures in which the filters inserted in the valves are saturated with brake fluid. Normally, the filling is effected in that a filling device is put onto a fill opening of the supply reservoir so as to tightly close the fill opening of the supply reservoir. Thereafter the air enclosed in the brake system is sucked off while the pressure drops. Evacuation of the wheel brake and of the brake lines connected to the wheel brake must be carried out through the inlet valve acting as a throttle.

The period of time between the commencement of the venting procedure and the generation of a vacuum required in the wheel brake is thus predetermined by the throttling effect of the solenoid valve. In addition, the filling procedure succeeding the venting procedure is obstructed in the same manner by the solenoid valve. Consequently, the entire procedure takes a relatively long time particularly in the event of the first charging of a hydraulic brake system during the line assembly.

It is therefore an object of the present invention to improve upon hydraulic brake systems of the type referred to such that the filling procedure can be performed in considerably less time.

SUMMARY OF THE INVENTION

This object will be achieved according to the present invention in that an additional connection controllable by a valve is established between the supply reservoir and the wheel brake. By way of the valve, which is maintained in the open position during venting and the subsequent filling with brake fluid, the pressure in the wheel brake is decreased during the venting procedure by by-passing the solenoid valve so that the vacuum required in the wheel brake will be available at a considerably earlier point of time. The supply reservoir, the master cylinder chamber and the line portion up to the solenoid valve are vented in a conventional manner. The throttling action of the solenoid valve is avoided. The passage of the valve is preferably of a relatively large cross-section which should correspond in about to the passage cross-section of the brake lines.

In a particularly simple and advantageous embodiment of the present invention, the valve is adapted to be switched to a closed position by a hydraulic pressure in the supply reservoir. As previously referred to, the valve must be in its opened position during venting and filling. The filling of brake systems of the type mentioned hereinabove will be effected such that the pressure fluid to be fed to the brake system will be exposed to a slight hydraulic pressure. The same hydraulic pressure will be generated in the brake system only after all cavities are filled. Hence, when the brake system is filled completely, the valve will automatically assume a stable closed position caused by the pressure prevailing in the brake system. In this arrangement, the valve is preferably designed such that it will assume a stable closed position in the presence of a hydraulic pressure of about 4 through 6 bar in the supply reservoir.

An expedient improvement of the brake system provides for the valve to be integrated into the housing of the master cylinder. Additionally, the valve serves to close a pressure fluid channel in the housing.

Normally, brake slip control apparatus comprise in addition to the inlet valve an outlet valve that is connected to the wheel brake and through which the effective braking pressure in the wheel brake can be decreased, with the inlet valve closed. It is therefore provided in a further embodiment of the present invention that the outlet valve connected to the wheel brake, in conjunction with the inlet valve and the valve disposed in the connection between the supply reservoir and the wheel brake, is arranged in a valve block that is flanged to the master brake cylinder. This way, a relatively compact configuration will be obtained in which all valves are accommodated.

Alternatively, the valve need not be closed by a hydraulic pressure in the supply reservoir, but can be closed manually. In this event, the valve is suitably designed as a seat valve which is adapted to be closed by a screw thread.

It is an advantage in the event of the hydraulic closing of the valve that the valve include a piston which is acted upon by atmospheric pressure on its one face, while its second end face is exposed to the pressure in the supply reservoir. To this end, the second end face is movable into abutment on the valve housing, with the valve opened, thus ensuring a defined inactive position of the piston and of the passage of the valve during venting and filling, respectively. In one embodiment, the piston comprises two end portions of larger diameter and a mid-portion of smaller diameter, one end portion thereof being sealedly guided in a cylinder bore, while the closure member of the valve is shaped at the other end portion. The cylinder bore if preferably part of an insert sleeve at which the valve seat is shaped. In a similar embodiment, the insert sleeve is preferably adapted to be screwed into a threaded bore of the housing of the valve block with the pre-assembled piston. Preferably material of higher quality is used for making the insert sleeve. It is furthermore provided that the piston portion guided in the cylinder bore has an enlarged diameter compared to the two other portions, resulting wherefrom is, on the one hand, that the valve closes already at a lower hydraulic pressure and moves into its closed position more reliably, while, on the other hand, when the construction is suitably dimensioned, the vacuum force prevailing in the system may be utilized to have the piston assume a position during the venting procedure in which the valve passage is opened.

As an alternative to the hydraulic and the manual control of the valve piston, the piston can be resiliently preloaded in the closed position of the valve and, is kept in the opened position during the filling procedure by a removable stop. Said stop, in turn, can be designed alternatively as a removable knub or pin which, upon termination of the venting and filling procedure, will be removed, while it is favorably arranged for that said knub or said pin, respectively, is movable into contact with the valve piston again so that further filing actions of the brake system subsequent to the first filling will be enabled by using the inventive idea.

BRIEF DESCRIPTION OF THE DRAWING

The present invention will be described in more detail with reference to the accompanying drawing in which.

DETAIL DESCRIPTION

Figure 1:
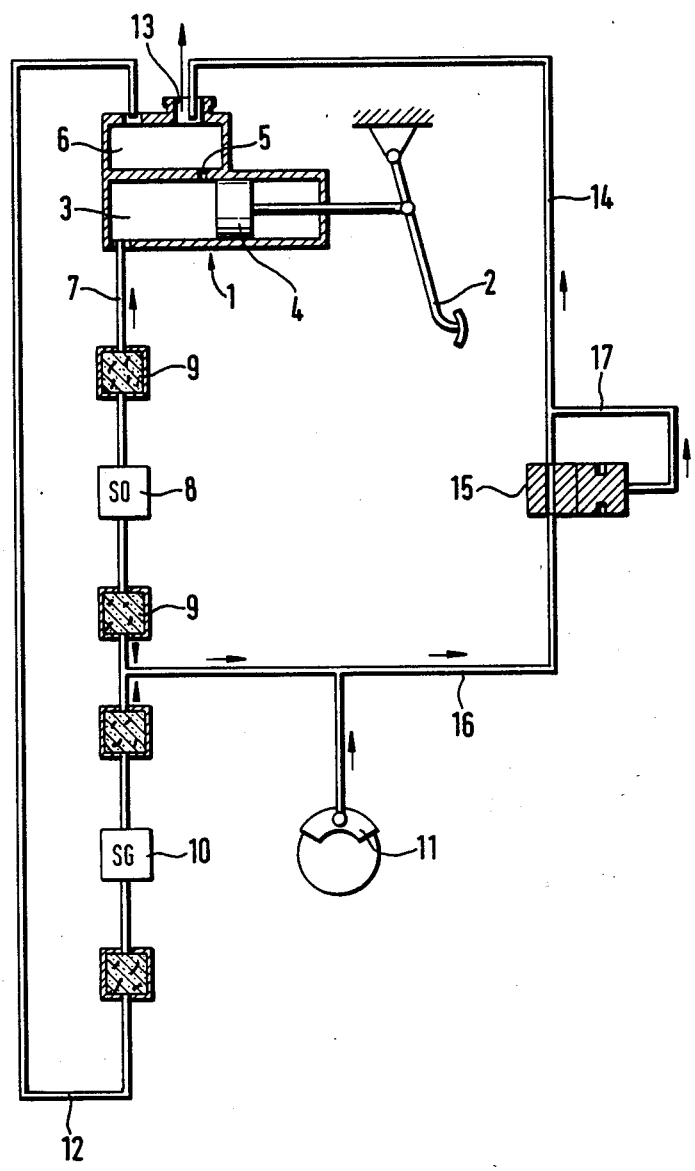
FIG. 1 is a schematic illustration of a hydraulic brake system installation incorporating a valve in accordance with the present invention; and, FIGS. 2, 3, 4, 5, and 6 show various cross-sectional views of valve configurations in accordance with the present invention.

In FIG. 1, reference numeral 1 designates a master cylinder which is actuatable by a brake pedal 2 so that a working chamber 3 of the master cylinder 1 can be pressurized. The working chamber 3 of the master cylinder 1 is confined by a master cylinder piston 4 which, in the inactive position to be seen from the drawing, opens a hydraulic connection to a supply reservoir 6 by way of a breather bore 5. Connected to the working chamber 3 of the master cylinder is a pressure line 7 which establishes hydraulic communication between the working chamber 3 of the master cylinder 1 and a wheel brake 11 by way of an electromagnetically actuable valve 8 which is opened in the inactive position and is connected through corresponding filter elements 9. Connected to the outlet of the solenoid valve 8 close to the wheel cylinder is a solenoid valve 10 from which a pressure line 12 extends to the unpressurized supply reservoir 6. The solenoid valve 10 is normally closed and adapted to be switched into an opened position by a slip control electronics not shown, so that pressure fluid can be removed from the wheel brake 11, and a corresponding pressure reduction may take place.

The unpressurized supply reservoir 6 contains an opening 13 which can be closed by a filling device not illustrated. Furthermore, a pressure fluid channel 14 leads from the unpressurized supply reservoir 6 to a valve 15, emanating from which, in turn, is a pressure fluid channel 16 leading to the wheel brake 11. Said valve 15 is designed as a two-way/two-position directional control valve whose switching position will be assumed in response to the pressure in the unpressurized supply reservoir 6, as is indicated by the control line 17.

Venting and filling, respectively, of the brake system to be seen from FIG. 1 will take place such that the filling device not shown is put on the opening 13 of the unpressurized supply reservoir 6 in the sealing engagement therewith. Subsequently, a vacuum pump will be put into operation which removes the air from the brake system so that the pressure will be decreased in total. Venting of the wheel brake 11 will be performed, by by-passing the solenoid valve 8, directly via the valve 15 and the pressure lines 14, 16. The pressure line 7 will be bled via the master cylinder chamber 3, the breather bore and the unpressurized supply reservoir 6. During this procedure, the pressure in the wheel brake 11 of the hydraulic brake system drops relatively quickly, since the valve 15 has no appreciable throttling effect.

In the event of the pressure in the brake system having decreased to a required value, a vent line of the non-illustrated filling device will be closed, and pressure fluid under low pressure will be introduced into the system. After the volume of the brake system has been topped up, hydraulic pressure of preferably 4 up to 6 bar will prevail in the entire brake system including the unpressurized supply reservoir 6, the said pressure becoming effective at the valve 15 via the control line 17 and switching the valve 15 to assume a stable second position, in which hydraulic communication between the pressure lines 14, 16 is permanently interrupted.

Figure 2:
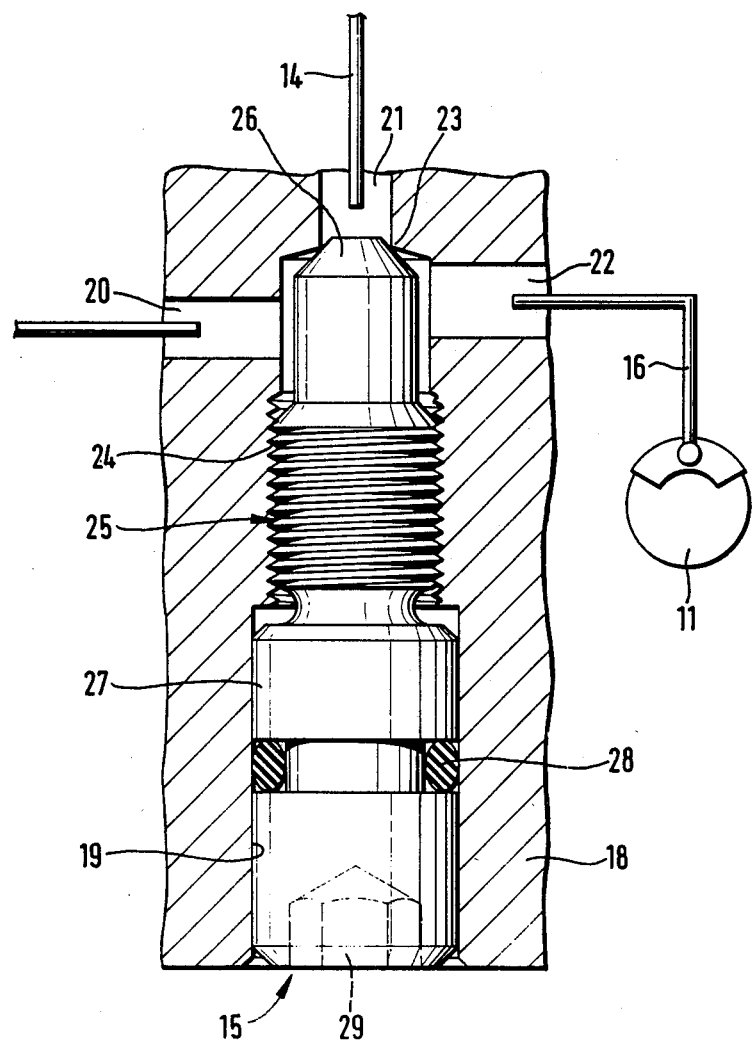

FIG. 2 shows a valve 15 in cross-section which comprises a housing 18 with a cylinder bore 19. Said housing 18 of the valve 15 contains three ports 20, 21, 22, the said port 20 communicating hydraulically with the solenoid valves 8 and 10 while connected to the housing port 21 is the pressure line 14 leading to the unpressurized supply reservoir 6, the pressure line to the wheel brake 11 branching off from the housing port 22. The upper end of the cylinder bore 19, when viewing the drawing, is designed as a valve seat 23 at the transition to the housing port 21. A mid-portion 24 of the cylinder bore 19 is provided with a thread in which a screw bolt 25 is arranged whose upper end, when viewing in the drawing, is designed as closure member 26 and which, coacting with the valve seat 23, forms a closable valve passage between the pressure lines 14, 16. The end portion of the screw bolt 25 remote from the closure member 26 carries a ring seal 28 and disposes at its end surface of a hexagonal recess 29, into which latter and appropriate screw tool can be inserted by which the valve passage 23, 26 is controllable manually.

Figure 3:
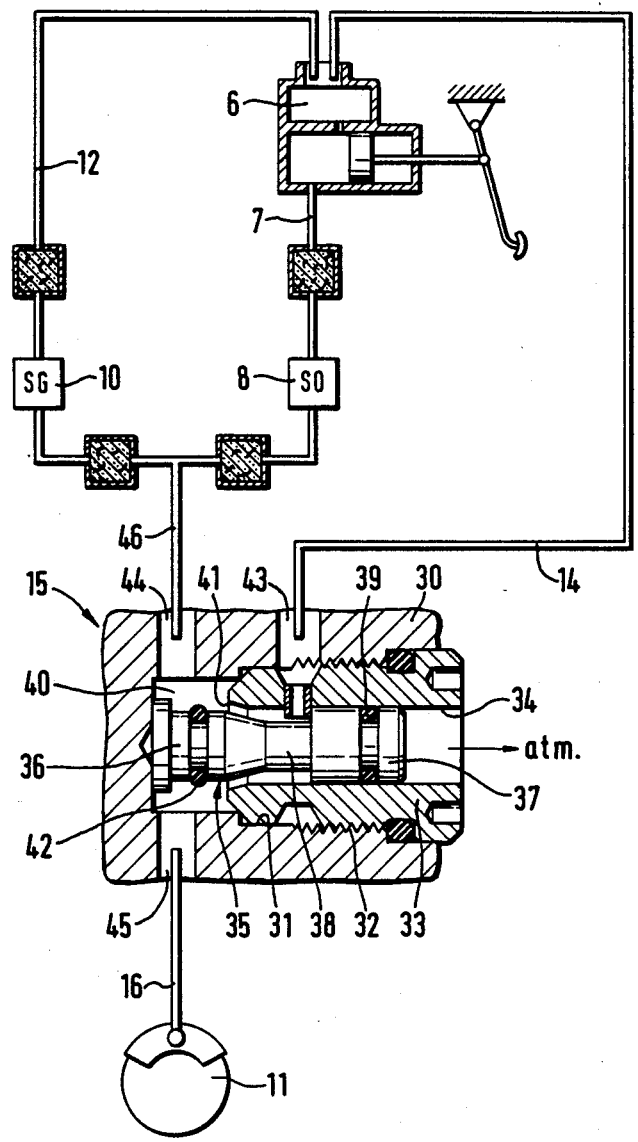

The valve 15 of FIG. 3, in turn, comprises a valve housing 30 containing a cylinder bore 31. Screwed into a thread 32 of the cylinder bore 31 is an insert sleeve 33 disposing of a bore 34, in which a piston 35 is slidably accommodated. Said piston 35 is designed as a stepped piston and comprises substantially two end portions 36, 37 of larger diameter and a mid-portion 38 of smaller diameter. The end portion 37 is provided with a ring seal 39 so that the housing interior 40 is sealed in relation to the atmosphere by means of the end portion 37.

At the transition from the mid-portion 38 to the end portion 36, the piston 35 is of tapered design, the same taper of piston 35 representing a closure member which forms the valve passage of the valve 15 in conjunction with a valve seat 41 shaped at the insert sleeve 33. Too increase the sealing effect of the valve passage when closed, the end portion 36 of the piston 35 likewise carries a ring seal 42 which will elastically deform to bear against the valve seat 41 in the closed position of the valve 15.

The valve 15 of FIG. 3 disposes of three housing ports 43, 44, 45, the said housing port 45 communicating via the pressure line 16 to the wheel brake 11. Branching off from the line connecting the two solenoid valves 8 and 10 is a pressure line 46 that leads to the housing port 44 of the valve 15. Finally, the third housing port 43 is succeeded by the pressure line 14 which terminates into the unpressurized supply reservoir 6.

During venting and filling, respectively, of the brake system of FIG. 3, all movable parts will adopt the inactive position to be seen from the drawing. The end portion 36 of the piston 35 abuts with its left surface, when viewing the drawing, on the valve housing 30, while the valve passage between the valve seat 41 and the closure member 35 is in its opened position. A like axial position of the piston 35 will be brought about either by the action of mechanical force on the right surface of the end portion 37, when viewing the drawing, or will be predetermined by manufacture as a result of the frictional action of the ring seal 39. When the unpressurized supply reservoir 6 is connected to a vacuum source, the entire brake system will be bled, the throttling effect of the solenoid valve 8 being eliminated, while the piston 35 maintains its axial position as the vacuum now prevailing in house interior 40 exerts a force component on the piston 35 in the opening direction of the valve passage 41, 35.

When charging the brake system with brake fluid that is subjected to a low hydraulic supply pressure, the entire surface of the end portion 37 of the piston 35 of the valve 15 will be acted upon in the closing direction of the valve, as a result whereof the piston 35 displaces to the right, when viewing in the drawing, until the valve passage 41, 35 is closed. Hence, likewise the pressure lines 14, 16 are shut off in relation to one another, so that the only connection between the supply reservoir 6 and the wheel brake 11 takes its course via the solenoid valve 8.

Figure 4:
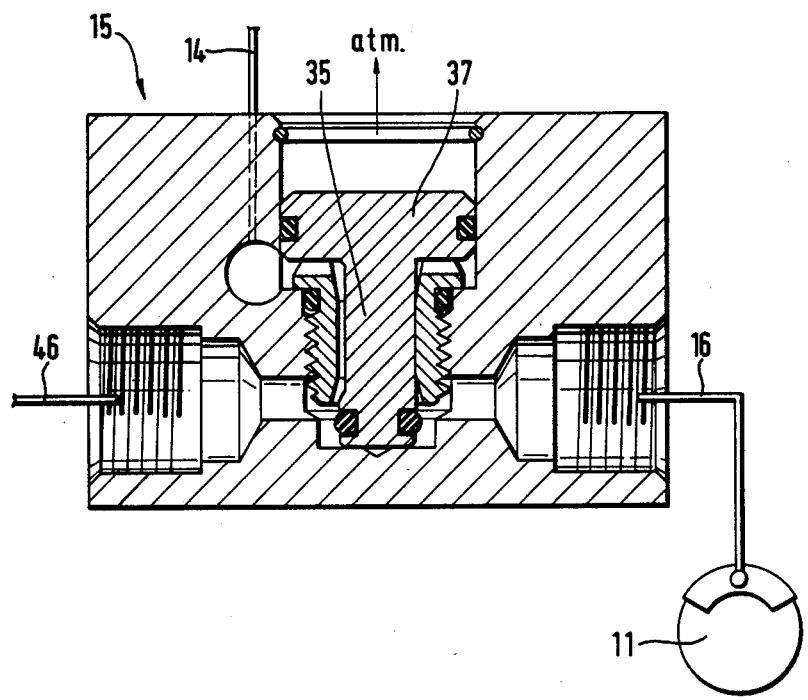

The valve 15 illustrated in FIG. 4 corresponds in all essential parts to the valve 15 of FIG. 3 so that a repeated functional description is unnecessary. In contrast to the valve 15 of FIG. 3, the valve 15 illustrated in FIG. 4 disposes of a piston 35 whose end portion 37 is of enlarged diameter. This has as a consequence that, during the venting procedure, a larger end face of the piston 35 will be exposed to the vacuum prevailing in the brake system, whereby the valve passage of the valve 15 is kept in the opened position during venting by a larger force.

Figure 5:
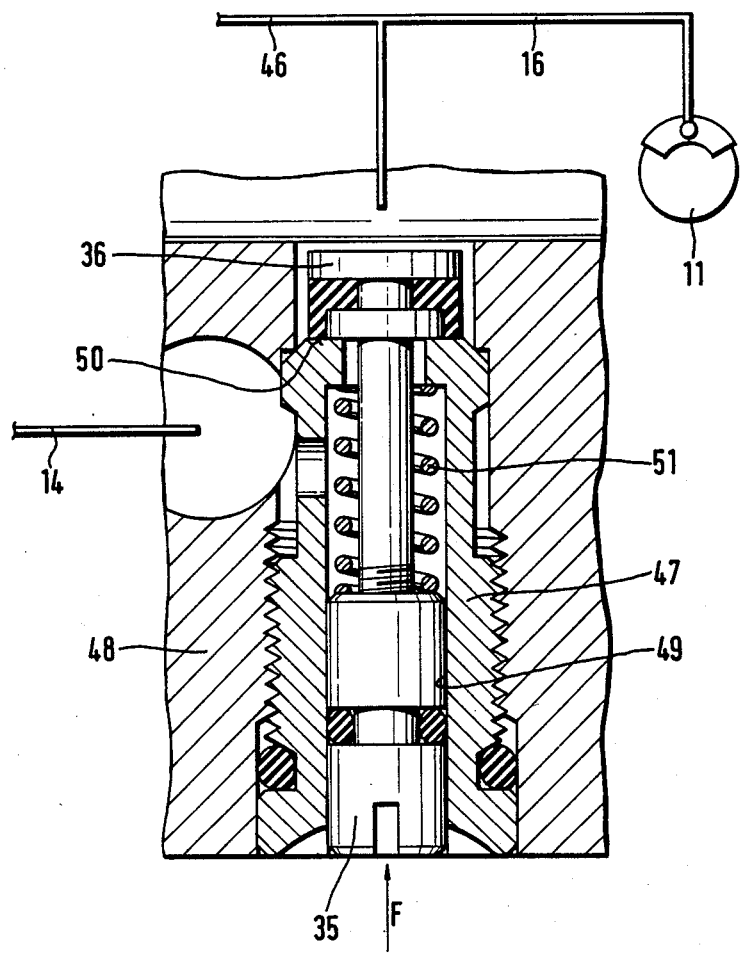

As regards the valve 15 illustrated in FIG. 5, again an insert element 47 is arranged in a valve housing 48, the said insert element 47 containing a cylinder bore 49 in which a piston 35 is arranged. The upper end of the insert element 47, when viewing in the drawing, is designed as a valve seat 50 and forms the valve passage of the valve in cooperation with the end portion 36 of the piston 35. Said piston 35 is preloaded in the closing direction of the valve passage 50, 36 by a compression spring 51, while a force F acts on the piston 35 which keeps the valve passage 50, 36 in the opened position during the venting and filling procedure. After having vented and subsequently filled the brake system, the force F will be removed so that the compression spring displaces the piston 35 into the position to be gathered from the drawing, in which the valve passage 50, 36 is closed, the pressure lines 14, 16 being simultaneously shut off in relation to one another as a consequence. The force F that can be exerted on the piston 35 is generated during the venting and filling procedure by a removable pin or a removable knub, for instance.

Figure 6:
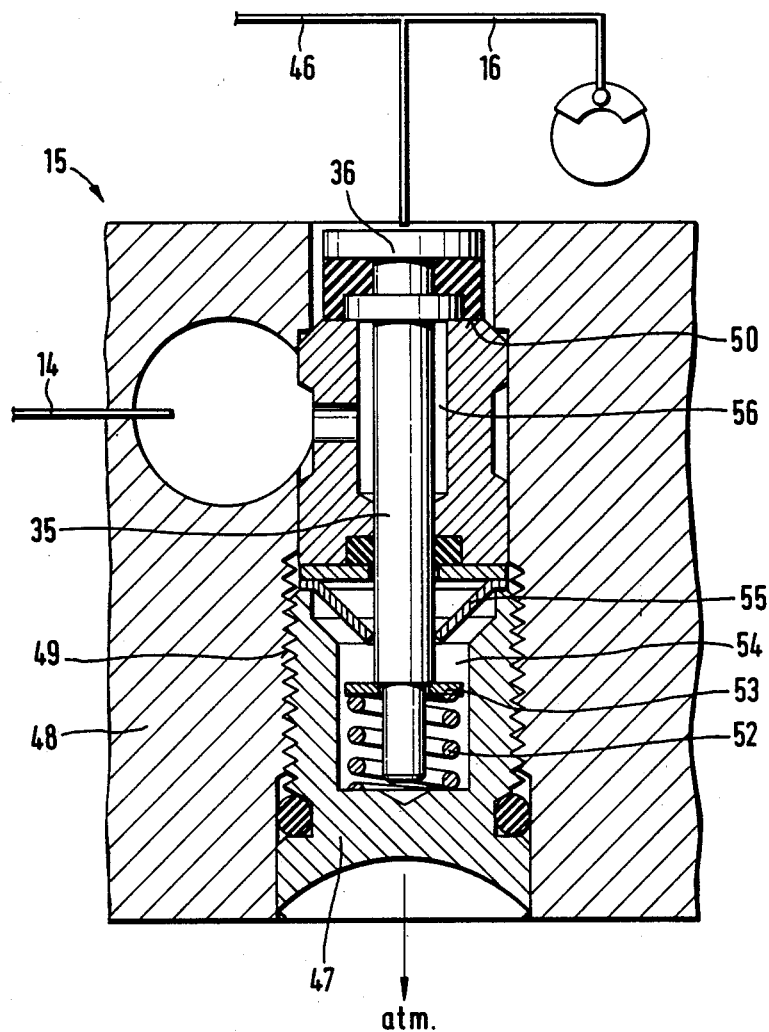

Finally, FIG. 6 illustrates, in turn, a valve 15 with a valve housing 48 which likewise accommodates an insert element 47 in a cylinder bore 49. They valve passage 36, 50 of the valve 15 is preloaded in the opening direction by a compression spring 52, the said compression spring 52 bearing against a spring plate 53 that is supported at the piston 35. The compartment 54 receiving the compression spring 52 communicates with the atmosphere. Engaging at the piston 35 is a friction element 55 which permits a downward movement of the piston 35, when viewing in the drawing, while it prevents said axial displacement in the opposite direction.

When manufacturing the valve of FIG. 6, the axial position of the piston 35 will be adjusted such as to ensure that the valve passage 36, 50 is opened. This position of the piston will be maintained stable, since the piston 35 acts via the compression spring 52 in the opening direction. Subsequent to the bleeding of the brake system via the pressure line 14, a pressure exceeding atmospheric pressure in the amount of about 4 up to 6 bar will develop in an annular chamber 56 of the valve 15 and cause the piston 35 to displace downwardly, when viewing in the drawing, in opposition to the force of the compression spring 52 so that the valve passage 50, 36 will assume a closed position. The friction element 55 will see to it afterwards that the piston 35 maintains this axial position after the filling with brake fluid so that the pressure lines 14, 16 will be permanently shut off in relation to one another.

What is claimed is:

1. A hydraulic brake system with slip control, wherein at least one wheel brake of an automotive vehicle is connected to a master cylinder, wherein a normally opened inlet valve is inserted in the connection between the master cylinder and the wheel brake, said inlet valve adapted to be switched into a closed position, and wherein the supply reservoir of the master cylinder includes an opening tightly closed by a filling device, wherein a connection is established between the supply reservoir (6) and the wheel brake (11) which is controlled by a first directional control valve (15), said first valve (15) having a control input responsive to hydraulic pressure in said supply reservoir (6) to switch said first valve (15) between open and closed positions and being arranged in said brake system to by-pass said inlet valve.

2. A hydraulic brake system as claimed in claim 1, wherein the valve (15) is adapted to be switched to a closed position by a pre-determined hydraulic pressure in the supply reservoir (6).

3. A hydraulic brake system as claimed in claim 2, wherein the valve (15) is switched to assume a stable closed position when an amount of pressure of greater than 4 bar prevails in the supply reservoir (6).

4. A hydraulic brake system as claimed in claim 3, wherein the valve (15) includes a piston (35) which is acted upon by atmospheric pressure on one face thereof, while a second end face thereof is exposed to the pressure in the supply reservoir (6).

5. A hydraulic brake system as claimed in claim 4. wherein the second end face of the piston (35) is movable into abutment on the valve housing, with the valve opened.

6. A hydraulic brake system as claimed in claim 4, wherein the piston (35) comprises two end portions (36, 37) of larger diameter and a mid-portion (38) of smaller diameter, one end portion (37) thereof being sealedly guided in a bore (34), while a closure member of the valve (15) is shaped at the other end portion (36).

7. A hydraulic brake system as claimed in claim 6, wherein the bore (34) is part of an insert sleeve (33) at which a valve seat (41) is formed.

8. A hydraulic brake system as claimed in claim 7, wherein the piston portion (37) guided in the bore (34)

is enlarged in its diameter compared to the other two portions (36, 38).

9. A hydraulic brake system as claimed in claim 1, wherein the valve (15) is integrated into the housing of the master cylinder (1).

10. A hydraulic brake system as claimed in claim 9, wherein the valve (15) serves to close a pressure fluid channel in the housing of the master cylinder (1).

11. A hydraulic brake system as claimed in claim 10, wherein a normally closed outlet valve (10) is connected to the wheel brake (11) wherein said outlet valve (10), together with an inlet valve (8) and said first valve (15), is arranged in a valve block flanged to the master cylinder (1).

12. A hydraulic brake system as claimed in claim 1, wherein the valve (15) is a seat valve which is adapted to be closed by means of a screw thread.

13. A hydraulic brake system as claimed in claim 1, wherein the piston (35) is resiliently preloaded in the closed position of the valve and, during the filling procedure, is held by a removable stop in the opened position of the valve.

* * * * *

UNITED STATES PATENT AND TRADEMARK OFFICE
CERTIFICATE OF CORRECTION

PATENT NO. : 4,902,077
DATED : Feb. 20, 1990
INVENTOR(S) : Juan Belart et al.

It is certified that error appears in the above—identified patent and that said Letters Patent is hereby corrected as shown below:

On the Title Page, Item [73] "Alfred Teves GmbH, Frankfurt am Main, Fed. Rep. of Germany" should read --ITT Industries, Inc., New York, N.Y.--.

[30] "Jun. 30, 1983 [DE] Fed. Rep. of Germany.......3323500" should read --[30] Jul. 8, 1983 [DE] Fed. Rep. of Germany.......3324631--.

Signed and Sealed this

Fifth Day of March, 1991

Attest:

HARRY F. MANBECK, JR.

*Attesting Officer*    *Commissioner of Patents and Trademarks*